(12) United States Patent
Vetter et al.

(10) Patent No.: US 11,021,048 B2
(45) Date of Patent: Jun. 1, 2021

(54) WINDOW WEATHER STRIP ARRANGEMENT

(71) Applicant: FYSAM AUTO DECORATIVE GMBH, Steinheim am Albuch (DE)

(72) Inventors: Rolf Vetter, Birenbach (DE); Stefan Sirrenberg, Wuppertal (DE)

(73) Assignee: FYSAM AUTO DECORATIVE GMBH, Steinheim am Albuch (DE)

(*) Notice: Subject to any disclaimer, the term of this patent is extended or adjusted under 35 U.S.C. 154(b) by 127 days.

(21) Appl. No.: 16/336,235

(22) PCT Filed: Sep. 5, 2017

(86) PCT No.: PCT/EP2017/072221
§ 371 (c)(1),
(2) Date: Mar. 25, 2019

(87) PCT Pub. No.: WO2018/059886
PCT Pub. Date: Apr. 5, 2018

(65) Prior Publication Data
US 2020/0016967 A1    Jan. 16, 2020

(30) Foreign Application Priority Data
Sep. 28, 2016 (DE) ..................... 10 2016 218 755.4

(51) Int. Cl.
*B60J 10/75* (2016.01)
*B60J 10/23* (2016.01)
(Continued)

(52) U.S. Cl.
CPC .............. *B60J 10/75* (2016.02); *B60J 10/23* (2016.02); *B60J 10/273* (2016.02); *B60Q 1/2661* (2013.01); *B60Q 1/323* (2013.01)

(58) Field of Classification Search
None
See application file for complete search history.

(56) References Cited

U.S. PATENT DOCUMENTS 5,463,831 A * 11/1995 Shinagawa .............. B60J 10/24
49/377
5,472,544 A   12/1995 Fukamachi et al.
(Continued)

FOREIGN PATENT DOCUMENTS

DE          19911424 A1    12/1999
DE        102014220630 A1   4/2016
(Continued)

OTHER PUBLICATIONS

International Search Report and Written Opinion issued in PCT/EP2017/072221, dated Apr. 11, 2019.
(Continued)

*Primary Examiner* — Catherine A Kelly
(74) *Attorney, Agent, or Firm* — Stephen T Olson; Harness, Dickey & Pierce, P.L.C.

(57) ABSTRACT

A window weather strip arrangement for covering at least sections of a window well of a motor vehicle includes a window weather strip carrier which can be secured on a vehicle skin and has a reinforcing core and a carrier sleeve accommodating the reinforcing core. The window weather strip arrangement further includes a window weather strip secured to the window weather strip carrier. The window weather strip carrier has a vehicle skin receiving portion for receiving sections of the vehicle skin and the window weather strip is secured to the window weather strip carrier on a side of the window weather strip carrier facing away from the vehicle skin receiving portion. A lamp is arranged in a lamp-receiving opening of the window weather strip and the reinforcing core protrudes out of the carrier sleeve overlapping with at least sections of the lamp-receiving opening, such that at least sections of the reinforcing core function as a reflector for the lamp.

19 Claims, 1 Drawing Sheet

(51) Int. Cl.
*B60J 10/273* (2016.01)
*B60Q 1/26* (2006.01)
*B60Q 1/32* (2006.01)

(56) References Cited

U.S. PATENT DOCUMENTS

| | | | |
|---|---|---|---|
| 6,217,807 | B1 | 4/2001 | Miyakawa et al. |
| 6,896,268 | B2 * | 5/2005 | Hofmann ................. B60J 10/00 200/61.43 |
| 7,934,341 | B2 * | 5/2011 | Knight .................... B60J 10/75 49/377 |
| 8,881,463 | B2 * | 11/2014 | MacDonald ............ B60J 10/32 49/493.1 |
| 10,029,549 | B2 * | 7/2018 | Yu .......................... B60J 10/265 |
| 10,377,296 | B2 * | 8/2019 | Stegemann .............. B60J 10/75 |
| 10,532,692 | B2 * | 1/2020 | Hundt .................... B60Q 1/268 |
| 10,625,576 | B2 * | 4/2020 | Kuster .................... B60J 1/001 |
| 2009/0280353 | A1 * | 11/2009 | Hirai ........................ C25F 3/24 428/687 |
| 2013/0133267 | A1 * | 5/2013 | Kanazawa ............... B60J 10/16 49/475.1 |
| 2017/0036590 | A1 * | 2/2017 | Stegemann .......... B60Q 1/2696 |
| 2018/0001815 | A1 * | 1/2018 | Hundt .................... B60R 13/06 |
| 2019/0001869 | A1 * | 1/2019 | Hundt ................. B60Q 1/0017 |

FOREIGN PATENT DOCUMENTS

DE 102015100327 A1 7/2016
EP 2930062 A1 10/2015

OTHER PUBLICATIONS

International Search Report (in English and German) and Written Opinion (in German) issued in PCT/EP2017/072221, dated Dec. 8, 2017; ISA/EP.

\* cited by examiner

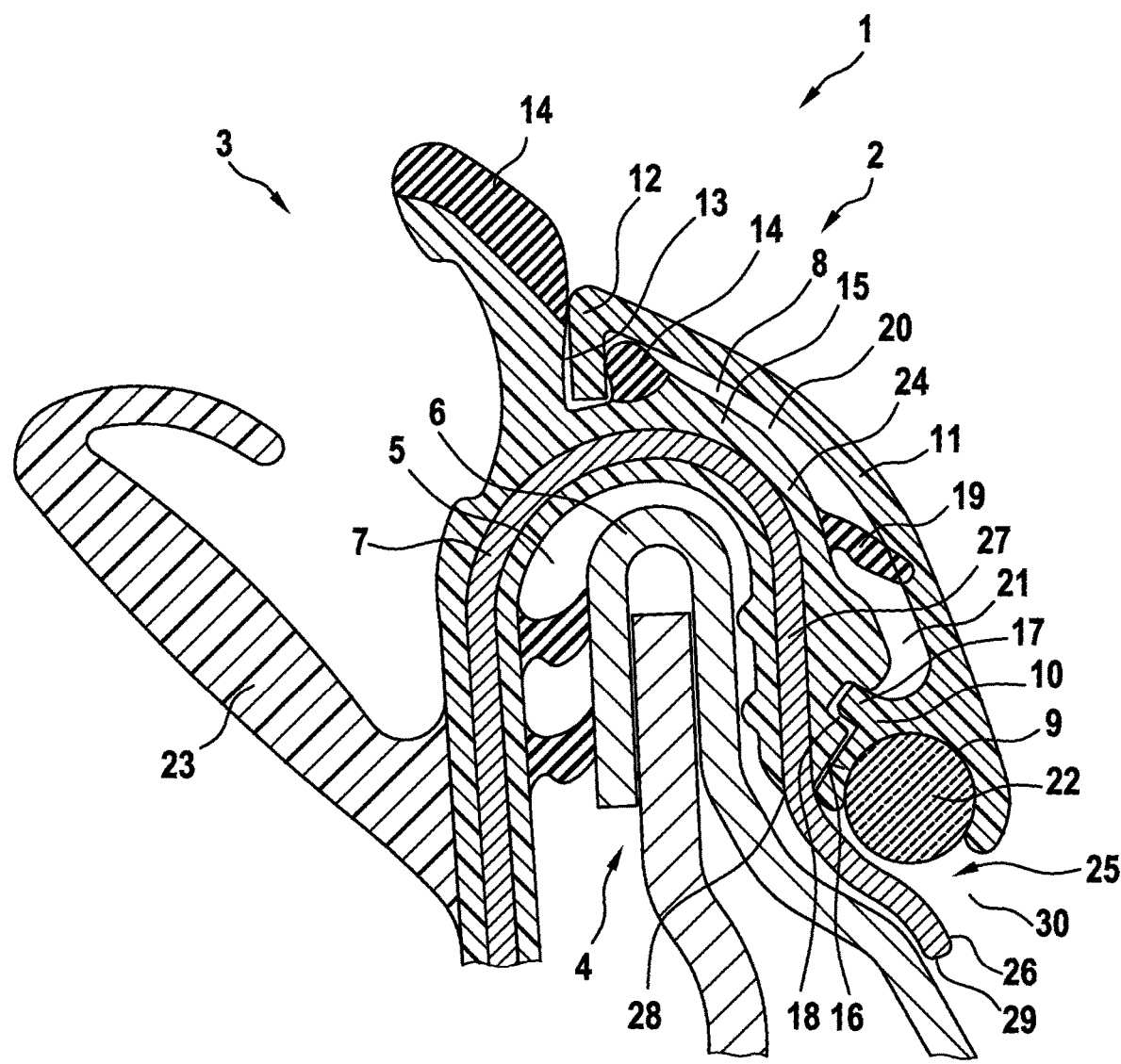

WINDOW WEATHER STRIP ARRANGEMENT

CROSS-REFERENCE TO RELATED APPLICATIONS

This application is a 371 U.S. National Stage of International Application No. PCT/EP2017/072221, filed Sep. 5, 2017, which claims priority to German Patent Application No. 10 2016 218 755.4, filed Sep. 28, 2016. The entire disclosures of the above applications are incorporated herein by reference.

The invention relates to a window weather strip arrangement for covering at least sections of a window well of a motor vehicle, comprising a window weather strip carrier which can be secured on a vehicle skin and has a reinforcing core and a carrier sleeve accommodating the reinforcing core, as well as comprising a window weather strip secured to the window weather strip carrier, wherein the window weather strip carrier has a vehicle skin receiving means for receiving sections of the vehicle skin, and the window weather strip is secured to the window weather strip carrier on a side of the window weather strip carrier facing away from the vehicle skin receiving means.

The window weather strip arrangement serves, on the one hand, for at least partially covering the window well of the motor vehicle relative to an external environment and, on the other hand, for achieving an esthetically pleasing design of the motor vehicle. The window slot is located on the body of the motor vehicle, for example on a door of the motor vehicle. The window slot is used for at least partially receiving a glazing, in particular a window pane, which is preferably displaceable, in particular retractable into the window slot. In such a configuration, the displacement can for example be such that, in a first position, the glazing sealingly closes a recess of the body of the motor vehicle or a window of the motor vehicle and at least partially releases it in a second position. In the first position, the glazing is mostly located outside the window slot. In the second position, however, the glazing engages further into the window slot than in the first position. In particular, the glazing in the second position is sunk further into the window slot than in the first position. Alternatively, the glazing can of course be arranged stationary with respect to the body.

The window slot is delimited on the outside, thus on its side facing towards the surroundings of the motor vehicle, by the vehicle skin. The window weather strip arrangement is arranged or secured at a free edge, which preferably delimits an opening of the window well. For example, this is provided in such a way that a glass seal of the window weather strip arrangement bears against the glazing, in particular as long as it is in the first position. The glass seal prevents moisture from penetrating into the window slot between the glazing and the glass seal.

For a reliable attachment on the one hand and for a visually pleasing design of the motor vehicle on the other hand, the window weather strip arrangement is composed on the one hand of the window weather strip carrier and on the other of the window weather strip which is attached to the window weather strip carrier. For example, the above-mentioned glass seal is arranged on the window weather strip carrier or is formed by it. The window weather strip now conceals the window weather strip carrier on the outside, that is, again, on the side facing the exterior of the motor vehicle, at least in sections, in particular for the most part. Insofar, the window weather strip is a visible part of the motor vehicle, which at least partially, in particular completely, conceals or covers the window weather strip carrier. The window weather strip carrier may be at least partially made of plastic, for example. By contrast, the window weather strip preferably consists of a visually appealing material, for example of metal. Particularly preferably, the window weather strip is made of aluminum or an aluminum alloy. However, also a window weather strip made of plastic is feasible.

The window weather strip carrier may be secured to the vehicle skin, while the window weather strip is in turn attached to the window weather strip carrier. Preferably, therefore, the window weather strip is secured to or engages the vehicle skin exclusively via the window weather strip carrier. The window weather strip carrier has the reinforcing core, which can be made of metal, for example. In particular, the reinforcing core is made of steel, preferably spring steel.

It is an object of the invention to provide a window weather strip arrangement which is advantageous with respect to known window weather strip arrangements, and which in particular allows a visually more pleasing design and improved functionality.

This is achieved, according to the invention, with a window weather strip arrangement with the features of claim 1. In this case, it is provided that a lamp is arranged in a lamp-receiving opening of the window weather strip and the reinforcing core protrudes out of the carrier cavity overlapping with at least sections of the lamp-receiving opening, such that at least sections of the reinforcing core function as a reflector for the lamp.

As seen in cross-section, the window weather strip is provided with the lamp-receiving opening. The lamp-receiving opening is preferably configured with an open edge, so that the lamp arranged within the lamp-receiving opening may emit light through an end opening of the lamp-receiving opening in the direction of an outer side of the motor vehicle or window weather strop arrangement. The lamp can extend from a first end of the window weather strip to a second end, which lies opposite the first end. Thus, the lamp has a longitudinal extent in the direction of the longitudinal central axis of the window weather strip, which at least substantially or exactly corresponds to the longitudinal extent of the window weather strip itself.

The lamp can be continuous, but does not have to be continuous. However, particularly preferably, the lamp runs continuously from the first end to the second end of the window weather strip. However, an interrupted configuration or only a section-wise form of the lamp may be provided. Of course, the lamp can also correspond to or overlap only a part of the longitudinal extension of the window weather strip. The lamp-receiving opening is preferably oriented in such a way that the lamp present in it has an illumination direction which points in the direction of the window weather strip carrier or the vehicle skin. It can therefore be provided for the lamp to directly illuminate the vehicle skin, so that a light strip is formed along the vehicle skin.

However, since the vehicle skin usually does not have good reflection properties, an additional reflector is provided, by means of which the light generated by the lamp is deflected in the direction of the outside environment. Preferably, the reflector is arranged between the lamp-receiving opening or the lamp and the vehicle skin, so that at least a portion of the light, in particular the most part of the light which is generated by the lamp, impinges on the reflector. In particular, the part of the light which impinges directly on the reflector is larger than the part which directly hits the vehicle skin. The reflector has a corresponding extension or a corresponding projection over the carrier sleeve.

Within the scope of a further embodiment of the invention, it is provided that the reinforcing core has, outside the carrier sleeve, a reflector region opposite the lamp-receiving opening and a core region accommodated in the carrier sleeve, wherein the reflector region has different surface properties than the core region. The reinforcing core is accommodated at least partially in the carrier sleeve. This preferably applies to the entire core region, while the reflector region is present outside the carrier sleeve. The reinforcing core and the carrier sleeve are preferably made of different materials. In particular, the material of the reinforcing core is stiffer than the material of the carrier sleeve.

The reflector region and the core region are preferably provided with different surface properties. For example, the reinforcing core may have a lower roughness in the reflector region than in the core region. For example, the reflector region is polished at least in sections, in particular completely, in order to achieve a particularly low roughness and therefore particularly good reflection properties. By contrast, the core region has a greater roughness, which in particular is such that a good adhesion of the vehicle skin to the reinforcing core or the core region is achieved. Preferably, in the production of the window weather strip carrier, the reinforcing core is formed with the carrier sleeve, for example by means of injection molding.

A preferred embodiment of the invention provides that the reinforcing core has a lower roughness in the reflector region than in the core region. This has already been discussed above. The different roughness of reflector region and core region is achieved, for example, by different surface treatment. Preferably, the reflector region is treated by means of a first surface treatment method and the core region by means of a second different surface treatment method. The first surface treatment method may be, for example, polishing, whereas the second surface treatment method consists of roughening, for example by grinding or sandblasting.

A development of the invention provides that the reinforcing core seen in cross-section passes through a passage opening present in a free end of the carrier sleeve, so that at least the reflector region protrudes from the carrier sleeve. The cross section is preferably perpendicular with respect to a longitudinal central axis of the window weather strip or the reinforcing core. The reinforcing core protrudes through the passage opening out of the carrier sleeve. The passage opening is formed in a free end of the carrier sleeve, wherein the free end is preferably in the form of a free edge, which extends over the entire longitudinal extension of the reinforcing core.

The reinforcing core is arranged such that at least the reflector region projects out of the carrier sleeve or is arranged outside of it. It can be provided that the reflector region adjoins directly to the core region. Of course, however, the reflector region can also be connected to the core region via a connection region. The connection region can in principle have any desired surface properties. It preferably has the same roughness as the core region or the reflector region. A roughness between the roughness of the reflector region and the roughness of the core region can also be provided.

A preferred embodiment of the invention provides that the passage opening is formed opposite of the vehicle skin, so that the reflector region protrudes in the direction of the vehicle skin. For example, the vehicle skin is arranged opposite the passage opening and curved in the direction of the outside environment, so that the reflector region protruding from the passage opening faces the vehicle skin.

However, a corresponding configuration of the reflector region, in particular a curvature of the reflector region, may also be provided. It is only important that the reflector region has a decreasing distance from the vehicle skin, starting from the passage opening in the direction pointing away from the passage opening towards the outside environment, at least in cross section.

A further embodiment of the invention provides that the reflector region approaches the vehicle skin in the direction of a free end of the reinforcing core. The free end of the reinforcing core is again preferably a free edge, which extends over the entire longitudinal extent of the reinforcing core. The free end is thus in an advanced position, as seen in cross-section. As already explained above, the reflector region should approach the vehicle skin starting from the passage opening. In this case, the free end of the reinforcing core preferably has the smallest distance from the vehicle skin. Conversely, this also means that the reflector region extends to the free end of the reinforcing core.

A further preferred embodiment of the invention provides that, seen in cross section, the window weather strip has a carrier receiving opening which is separated from the lamp-receiving opening by means of a separating web and receives the window strip carrier in some regions. As seen in cross section, the window weather strip thus has a plurality of openings, namely at least the lamp-receiving opening and the carrier receiving opening. Both openings are configured as open-edge, wherein the carrier receiving opening is open in the direction of the window weather strip carrier. In this case, the window weather strip carrier is at least partially disposed in the carrier receiving opening such that the window weather strip is held on the window weather strip carrier. The lamp-receiving opening and the carrier receiving opening are separated from each other by the separating web. The separating web extends, starting from a main body of the window weather strip generally in the direction of the vehicle skin or the window weather strip carrier.

A particularly preferred embodiment of the invention provides that the reinforcing core, in particular the reflector region, linearly rests on the window weather strip, in particular on the separating web. By way of example, the window weather strip bears against the abovementioned connecting region of the reinforcing core, which is present between the reflector region and the core region or connects them to one another. In particular, the separating web, which separates the lamp-receiving opening from the carrier-receiving opening, projects in the direction of the reinforcing core in such a way that it bears against this or its reflector region. This contact is preferably linear, in particular continuously over the entire longitudinal extension of the window weather strip or the reinforcing core.

A further preferred embodiment of the invention provides that the carrier receiving opening is delimited on its side opposite the separating web by a holding web which engages in a holding receiving means of the window weather strip carrier. The holding web is used to attach the window weather strip to the window weather strip carrier. To this end, it engages in the holding receiving means of the window weather strip carrier. The holding receiving means extends, as seen in cross-section, preferably at least substantially parallel to the vehicle skin. The holding web is preferably angled with respect to the above-mentioned main body of the window weather strip, in particular it forms therewith an acute angle, i.e. an angle which is smaller than 90°.

In the context of a further embodiment of the invention it may be provided that the separating web rests against a support surface of the window weather strip carrier and that a latching projection protrudes from the separating web, which engages in a latching manner in a latching recess adjacent to the support surface of the window weather strip carrier. Also, the separating web functions as an attachment of the window weather strip to the window weather strip carrier. The window weather strip is supported by means of the separating web on the window weather strip carrier, namely by the separating web resting against the support surface. The latching projection protrudes from the separating web, which projection engages in the recess of the window weather strip carrier such that a connection is provided, which engages from behind. Due to the interaction of the holding web and the latching projection with the window weather strip carrier or due to their engagement in the corresponding recesses, i.e. the holding recess and the latching recess, the window weather strip may be held in a reliable way but without requiring a destructive disassembly.

A further embodiment of the invention provides that the lamp-receiving opening is delimited on its side facing away from the separating web by an inner side of a curved outer wall of the window weather strip, wherein, as seen in cross section, a lighting gap is formed between the window weather strip, in particular a free end of the window weather strip, and the window weather strip carrier, in particular the reflector region. The lamp-receiving opening is delimited on the one hand by the separating web and on the other hand by the inside of the curved outer wall of the window weather strip. The outer wall is part of the main body from which the separating web projects, especially at an angle between 145° and 135°, for example. Preferably, the inside of the outer wall is also curved, so that a wall delimiting the lamp-receiving opening, which is partially formed by the inner side and in part by the separating web, has a continuous curved extension. Particularly preferably, the wall has a constant curvature along most part of its extension in the peripheral direction with respect to a longitudinal central axis of the lamp-receiving opening, so that it is at least partially semicircular and correspondingly the lamp-receiving opening has a partial circular cross section.

In order to enable the emission of light generated by the lamp from the lamp-receiving opening in the direction of the outside environment, the lighting gap is formed between the window weather strip and the window weather strip carrier. In particular, the lighting gap is present between the free end of the window weather strip and the reflector region of the window weather strip carrier or the reinforcing core. The lighting gap preferably extends continuously over the entire longitudinal extension of the window weather strip or the window weather strip carrier. An interrupted configuration of the lighting gap to achieve a specific illumination pattern can also be provided. It is also possible that the lighting gap extends over only a part of the longitudinal extension.

A development of the invention provides that the reflector region, seen in cross section, is curved or bent away from the window weather strip in the direction of its free end. It has already been explained above that the reinforcing core rests against the window weather strip, in particular linearly. Starting from the contact point of the reinforcing core on the window weather strip, the distance between them should increase in the direction of the external environment, so that the lighting gap is formed between the window weather strip and the window weather strip carrier. For this purpose, the reinforcing core or its reflector region is correspondingly curved or bent.

A preferred embodiment of the invention provides that the reinforcing core is made of a material, which is stiffer than the carrier sleeve and/or the window weather strip. This has already been pointed out above. The reinforcing core is preferably made of a metal, for example steel, in particular spring steel. The window weather strip can also be made of metal, preferably of aluminum or an aluminum alloy. By contrast, the carrier sleeve is preferably made of a plastic, in particular of a resilient plastic, so that excellent sealing properties of the window weather strip arrangement can be achieved. It can be provided that the reinforcing core is made of a material stiffer than the window well and this in turn is made of a stiffer material than the carrier sleeve.

A preferred further embodiment of the invention provides that the window weather strip carrier has at least one sealing lip resting on the window weather strip, which in particular passes through the carrier receiving opening. The sealing lip prevents moisture from passing between the sealing lip and the window weather strip between the window weather strip and the plastic carrier. For this purpose, the sealing lip preferably passes through the carrier receiving opening and divides in so far the cross-section of the carrier receiving opening in two sub-regions.

Finally, it can be provided within the scope of a further embodiment of the invention that the window weather strip is provided as an extruded component provided with a surface layer. The window weather strip is formed by an extruded component, i.e. it has a constant cross section along its longitudinal central axis, preferably at least for the most part, in particular continuously. Particularly preferably, the window weather strip has a continuous straight extension, so that its longitudinal central axis is also straight. Of course, however, a curved configuration of the window weather strip can be realized, so that the longitudinal central axis is also curved. The window weather strip is provided with the surface layer, which on the one hand serves as protection against environmental agents and on the other hand provides for a visually appealing design. The window weather strip has two ends facing one another in the direction of their longitudinal central axis, namely the first end and the second end. At these, the window weather strip may at least be partially closed.

A further embodiment of the invention provides that the window weather strip is integrally formed. Furthermore, the window weather strip can be made of the same material, that is, consist of the same material throughout.

Within the scope of a further embodiment of the invention, it is provided that the surface layer is present as a surface treatment layer or as a surface coating. In the first case, the surface layer is achieved by a surface treatment of the window weather strip. If the surface layer is configured as a surface coating, additional material is applied to the window weather strip. The surface treatment layer can be produced, for example, by anodizing the window weather strip, while the surface coating is present, for example, as a lacquer layer, powder layer or film layer and is produced correspondingly by lacquering, powder coating or filming.

Within the scope of a preferred further embodiment of the invention, it is provided that the carrier receiving opening is divided by the sealing lip into a first receiving opening region and a second receiving opening region. The sealing lip of the window weather strip carrier, which rests against the window weather strip, insofar passes through the carrier receiving opening, preferably completely. In this respect, both the first receiving opening region and the second receiving opening region are completely encompassed, as seen in cross-section, by the window weather strip and the window weather strip carrier and are separated from one another by the sealing lip. For example, a wiring for a power supply of the lamp may be provided in one of the receiving opening regions. Of course, alternatively, an optical waveguide can be provided in one of the receiving opening regions, to which the lamp is connected.

A further preferred embodiment of the invention provides that the lamp is surrounded, as viewed in cross-section, and in the circumferential direction with respect to its longitudinal central axis, to an extent of at least 50%, at least 60%, at least 70% or at least 75% of the window weather strip. With such an embodiment of the window weather strip or the lamp, the lamp is securely held in the lamp-receiving means. For example, it is provided to clip the lamp into the lamp-receiving opening during arrangement of the window weather strip arrangement.

A development of the invention provides that the lamp has a circular cross section. However, other embodiments may also be realized in principle.

A further embodiment of the invention provides that the lamp is provided as an optical waveguide or as a lamp arrangement comprising a plurality of lamps. In the case of the optical waveguide, the latter preferably runs continuously from the first end to the second end. Alternatively, the lamp may comprise a multiplicity of lamps, for example light-emitting diodes, which are combined to form the lamp arrangement.

A further preferred embodiment of the invention provides that the lamp has a tubular sleeve, in which the optical waveguide and/or the light arrangement are received. The tubular sleeve serves to protect the optical waveguide or the lamp arrangement from environmental influences. In addition, the sleeve allows easy installation, especially if it is elastic.

A further embodiment of the invention provides that the latching projection is angled with respect to the separating web in cross-section, in particular is perpendicular thereto. With such an arrangement of the latching projection, a particularly advantageous locking action is achieved.

Finally, in the context of a further embodiment of the invention it can be provided that the holding web, as seen in cross section, rests on both sides on a first material region of the window weather strip carrier and the separating web and/or the latching projection each rest at least on one side on a second material region of the window weather strip carrier, wherein the window weather strip carrier in the first material region has different material properties than in the second material region, in particular consists of a softer material. Insofar, the window weather strip carrier is composed of several material regions, at least the first material region and the second material region. For this purpose, the window weather strip carrier is produced for example by means of a multi-component injection molding process.

As seen in cross-section, the holding web rests on the first material region both on its first side and on its second side opposite the first side. The above-described sealing lip of the window weather strip carrier can also be associated to the first material region. The separating web or the latching projection now bears against the second material region at least on one side. Particularly preferably, the latching recess of the window weather strip carrier, in which the latching projection is arranged, is completely formed in the second material region. The first material region preferably consists of a softer material than the second material region. In this way, a particularly good support effect of the window weather strip carrier for the window weather strip is achieved.

The invention, of course, also relates to a motor vehicle having a window weather strip arrangement as described in the present description. The window weather strip arrangement can be developed further in accordance with the above explanations, so that reference is made thereto.

The invention will be explained in more detail with reference to the embodiments illustrated in the drawings, without any limitation of the invention.

The only FIGURE shows a schematic cross-sectional view of a window weather strip arrangement, which has the window weather strip and a window weather strip carrier.

The FIGURE shows a schematic cross-sectional view of a window weather strip arrangement 1 for arrangement on a motor vehicle. The window weather strip arrangement is provided for covering, in particular at least partially covering, a window well of the motor vehicle, which is not shown here in detail. The window weather strip arrangement 1 has a window weather strip 2, which is preferably provided as an extruded component and which is more preferably at least partially, in particular completely closed at two opposite ends in the direction of its longitudinal central axis. A window weather strip carrier 3 is provided in addition to the window weather strip 2. This carrier serves to secure the window weather strip 2 to a vehicle skin 4, which is indicated here by way of example. The window weather strip carrier 3 preferably has a vehicle skin receiving means 5 which serves to accommodate an edge region, namely a free edge 6 of the vehicle skin 4. The window weather strip carrier 3 further has a reinforcing core 7, which is partially surrounded by the material of the window weather strip carrier 3.

The window weather strip 2 has a carrier receiving opening 8 and a lamp-receiving opening 9. Both receiving openings 8 and 9 are formed with an open edge and are separated by a separating web 10, as seen in cross-section. The separating web 10 projects from a main body 11 of the window weather strip 2. On its side facing away from the separating web 10, the carrier receiving opening 8 is delimited by a holding web 12, which engages in a holding receiving means 13 of the window weather strip carrier 3. The holding web 12 preferably rests only on a material region 14 of the window weather strip carrier 3, which consists of a material, which is softer than in a second material region 15.

The separating web 10 rests against a flat support surface 16 of the window weather strip carrier 3. A latching projection 17 extends from the separating web 10, which engages in a recess 18 of the window weather strip carrier 3. The latching recess 18 and the support surface 16 are preferably located completely in the second material region 15. A sealing lip 19, which preferably lies in the first material region 14 or is formed thereof, passes completely through the carrier receiving opening 8 starting from the window weather strip carrier 3 and rests on its side facing away from the window weather strip carrier 3 on the window weather strip 2 and the main body 11. In that regard, the sealing lip 19 divides the carrier receiving opening 8 into a first receiving opening region 20 and a second receiving opening region 21.

In the lamp-receiving opening 9 a lamp 22 is arranged, which preferably has a circular cross-section. The lamp 22 is formed by an optical waveguide, for example, which is provided with a coating such that light emerges from it along its longitudinal extension. Consequently, the optical waveguide is designed as a so-called "light string." The lamp-receiving opening 9 or its mouth opening is oriented such that the lamp 22 illuminates in the direction of the vehicle skin 4. In this case, the lamp 22 is preferably continuous in the direction of the longitudinal central axis of the window weather strip 2 and extends from the first end to the second end.

Furthermore, it can be seen that a glass seal 23 is formed on the window weather strip carrier 3, which seal rests against a glazing after arrangement of the window weather strip strip arrangement 1 on the motor vehicle, in particular in a sealing manner. Furthermore, it is shown that a carrier sleeve 24 of the window weather strip carrier 3 receives the reinforcing core 7 only in certain regions. This means that the reinforcing core 7 protrudes from the carrier sleeve 24. This is provided in such a way that the reinforcing core 7 protrudes, at least partially, over the lamp-receiving opening 9 and thus at least partially serves as a reflector 25 for the lamp 22. In particular, the reinforcing core 7 consists of a reflector region 26 located outside the carrier sleeve 24 and a core region 27 accommodated within the carrier sleeve 24. The reflector region 26 is positioned opposite to the lamp-receiving opening 9. Preferably, the reflector region 26 has different surface properties than the core region 27, in particular it is designed with a lower roughness. For example, the reflector region 26 is polished, while the core region 27 has a correspondingly high roughness for better adhesion of the carrier sleeve 24.

The reinforcing core 7 passes through a passage opening 28 of the carrier sleeve 24, which is formed in a free end of the carrier sleeve 24. Accordingly, at least the reflector region 26 of the reinforcing core 7 projects out of the carrier sleeve 24. The reflector region 26 extends in the direction of the vehicle skin 4. The distance between the reinforcing core 7 and the vehicle skin 4 decreases, as seen in cross-section, starting from the passage opening 28 in the direction of a free end 29 of the reflector regions 26 and the reinforcing core 7.

It may be envisaged that the reflector region 26 has above said surface properties, in particular a roughness which is less than the core region 27, only on its side facing the lamp 22 or the lamp-receiving opening 9. It can further be provided that the reflector region 26 has the same surface properties as the core region 27 on its side facing away from the lamp 22 or the lamp-receiving opening 9, in particular the same roughness. In this way, only a smaller surface region of the reinforcing core 7 has to be surface-treated, in particular polished, in order to achieve better reflection properties.

It can be seen that the window weather strip 2, namely the separating web 10, rests against the reinforcing core 7 or its reflector region 26. This contact is preferably linear, namely in particular over the entire longitudinal extension of the window weather strip 2 or the window weather strip carrier 3 or its reinforcing core 7. Starting from this contact point, the distance between the window weather strip 2 and the reinforcing core 7 increases in the direction of the free end 29, at least as seen in cross-section, so that a lighting gap 30 is formed on the side opposite the contact point, between the reinforcing core 7 and the window weather strip 2, through which light generated by the lamp 22 can exit in the direction of an external environment. In order to form the lighting gap 30, the reflector region 26 is curved away from the window weather strip 2, for example, as seen in cross section, in the direction of its free end 29.

The described window weather strip arrangement 1 allows both a reliable sealing of the window well and a visually pleasing configuration of the motor vehicle. Due to the the reinforcing core 7 protruding from the carrier sleeve 24, a reflector 25 for the lamp 22 with excellent reflection properties is also provided in a cost-effective manner.

The invention claimed is:

1. A window weather strip arrangement for covering at least sections of a window well of a motor vehicle, the window weather strip arrangement comprising:
   a window weather strip carrier secured on a vehicle skin and having a reinforcing core and a carrier sleeve accommodating the reinforcing core;
   as well as comprising a window weather strip secured to the window weather strip carrier, the window weather strip carrier having a vehicle skin receiving portion for receiving sections of the vehicle skin, the window weather strip secured to the window weather strip carrier on a side of the window weather strip carrier facing away from the vehicle skin receiving portion; and
   a lamp arranged in a lamp-receiving opening of the window weather strip;
   wherein the reinforcing core protrudes out of the carrier sleeve and at least sections of the reinforcing core overlap with the lamp-receiving opening, such that the at least sections of the reinforcing core function as a reflector for the lamp; and
   wherein the reinforcing core extends beyond the lamp-receiving opening of the window weather strip at a free end of the reinforcing core.

2. The window weather strip arrangement according to claim 1, wherein the at least sections of the reinforcing core have a reflector region opposite the lamp-receiving opening and a core region received in the carrier sleeve, the reflector region having different surface properties than the core region.

3. The window weather strip arrangement according to claim 2, wherein the reinforcing core in the reflector region has a lower roughness than in the core region.

4. The window weather strip arrangement according to claim 1, wherein the at least sections of the reinforcing core have a reflector region opposite the lamp-receiving opening the reinforcing core passes through a passage opening present in a free end of the carrier sleeve, so that at least the reflector region extends out of the carrier sleeve.

5. The window weather strip arrangement according to claim 4, wherein the passage opening is formed opposite of the vehicle skin, so that the reflector region protrudes in a direction of the vehicle skin.

6. The window weather strip arrangement according to claim 1, wherein the at least sections of the reinforcing core have a reflector region opposite the lamp-receiving opening and the reflector region approaches the vehicle skin towards the free end of the reinforcing core.

7. The window weather strip arrangement according to claim 1, wherein, the window weather strip has a carrier receiving opening separated from the lamp-receiving opening by a separating web, the carrier receiving opening receiving at least sections of the window weather strip carrier.

8. The window weather strip arrangement according to claim 7, wherein the at least sections of the reinforcing core have a reflector region opposite the lamp-receiving opening and the reflector region of the reinforcing core linearly rests against the window weather strip at the separating web.

9. The window weather strip arrangement according claim 7, wherein the carrier receiving opening on a side opposite the separating web is delimited by a holding web, which engages in a holding receiving portion of the window weather strip carrier.

10. The window weather strip arrangement according to claim 7, wherein the separating web rests against a support surface of the window weather strip carrier and a latching projection extends from the separating web, which projection engages in a latching manner into a latching recess of the window weather strip carrier adjacent a support surface.

11. The window weather strip arrangement according to claim 7, wherein the at least sections of the reinforcing core have a reflector region opposite the lamp-receiving opening and wherein the lamp-receiving opening is delimited on a side facing away from the separating web by an inner side of a curved outer wall of the window weather strip, wherein, seen in cross-section, between a free end of the window weather strip, and the reflector region of the window weather strip carrier, a lighting gap is formed.

12. The window weather strip arrangement according to claim 1, wherein the at least sections of the reinforcing core have a reflector region opposite the lamp-receiving opening and the reflector region, extends away from the window weather strip in a direction of a free end of the weather strip.

13. The window weather strip arrangement according to claim 1, wherein the reinforcing core is constructed of a stiffer material than at least one of the carrier sleeve and the window weather strip.

14. The window weather strip arrangement according to claim 1, wherein the window weather strip carrier has at least one sealing lip resting on the window weather strip.

15. The window weather strip arrangement according to claim 1, wherein the window weather strip is an extruded component with a surface layer.

16. The window weather strip arrangement according to claim 14, wherein the at least one sealing lip passes through the carrier receiving opening.

17. The window weather strip arrangement according to claim 1, wherein the free end of the reinforcing core the reinforcing core protrudes out from the carrier sleeve to define the reflector for the lamp.

18. The window weather strip arrangement according to claim 1, wherein the lamp-receiving opening is defined by first and second longitudinally extending portions spaced apart from one another, the first longitudinally extending portion resting against the reinforcing core, the second longitudinally extending portion spaced from the reinforcing core by the lamp-receiving opening.

19. The window weather strip arrangement according to claim 1, wherein the lamp has a cylindrical cross section supported in the lamp-receiving opening.

* * * * *